United States Patent [19]

Oosterling et al.

[11] 4,098,432

[45] Jul. 4, 1978

[54] DEVICE COMPRISING AN ADJUSTABLE DOSING MEMBER FOR SPREADING DISTRIBUTABLE MATERIAL

[75] Inventors: Pieter Adriaan Oosterling; Gijsbert Jan Mijnders, both of Nieuw-Vennep, Netherlands

[73] Assignee: Vicon N.V., Nieuw-Vennep, Netherlands

[21] Appl. No.: 508,902

[22] Filed: Sep. 24, 1974

[30] Foreign Application Priority Data

Sep. 26, 1973 [NL] Netherlands ..................... 7313291
Apr. 17, 1974 [NL] Netherlands ..................... 7405225

[51] Int. Cl.² .......................................... A01C 15/00
[52] U.S. Cl. ................................ 222/43; 222/44; 222/47; 222/555; 239/676; 239/688; 403/46
[58] Field of Search .................... 222/31, 44, 46, 48, 222/49, 555, 498, 505, 310, 311, 317, 43; 239/676, 688; 403/43, 44, 45, 46, 47, 77, 118, 27

[56] References Cited

U.S. PATENT DOCUMENTS

| 1,418,298 | 6/1922 | Gorman ............................ 403/46 |
| 2,078,192 | 4/1937 | Buhr et al. .................. 403/118 X |
| 2,560,850 | 7/1951 | Day ................................. 33/166 |
| 2,675,947 | 4/1954 | Wynn ............................ 222/505 |
| 2,728,492 | 12/1955 | Fox .......................... 222/310 X |
| 2,778,528 | 1/1957 | Corcoran ........................ 222/46 |
| 2,840,275 | 6/1958 | Liljenberg ................... 222/43 X |
| 3,025,068 | 3/1962 | van der Lely ............... 239/685 |
| 3,742,865 | 7/1973 | Adler ...................... 222/505 X |

FOREIGN PATENT DOCUMENTS

| 517,459 | 2/1955 | Italy ................................ 222/46 |
| 6,717,660 | 7/1969 | Netherlands .................. 239/676 |

*Primary Examiner*—Allen N. Knowles
*Assistant Examiner*—Frederick R. Handren
*Attorney, Agent, or Firm*—Snyder, Brown & Ramik

[57] ABSTRACT

The invention relates to a device for spreading distributable material, more particularly, fertilizer in granular or powdery form, said device comprising a hopper having at least one outlet port and a spreading member connected herewith and a dosing member to be adjusted for defining the passage of each outlet port, a control-mechanism moving the dosing member into a position in which the outlet port is closed or into the adjusted position; the invention has for its object to spread said material accurately and provides screw means operative between the dosing member and the control-mechanism for very sensitive adjustment said dosing member.

10 Claims, 8 Drawing Figures

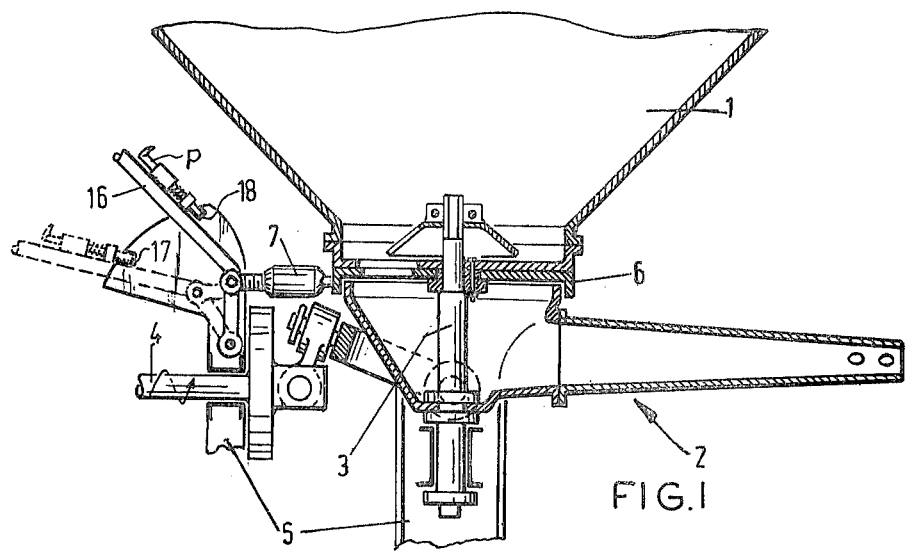
FIG.1
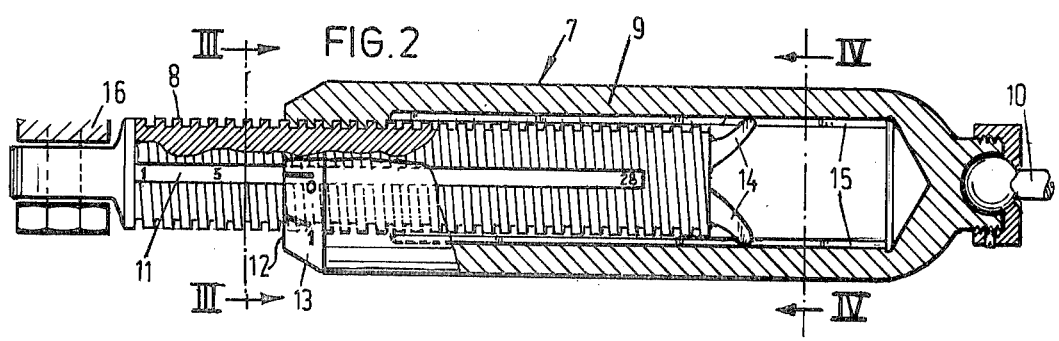
FIG.2
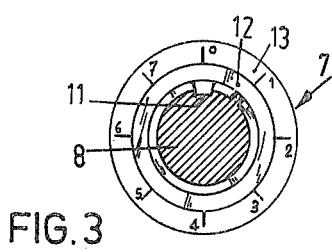
FIG.3
FIG.4

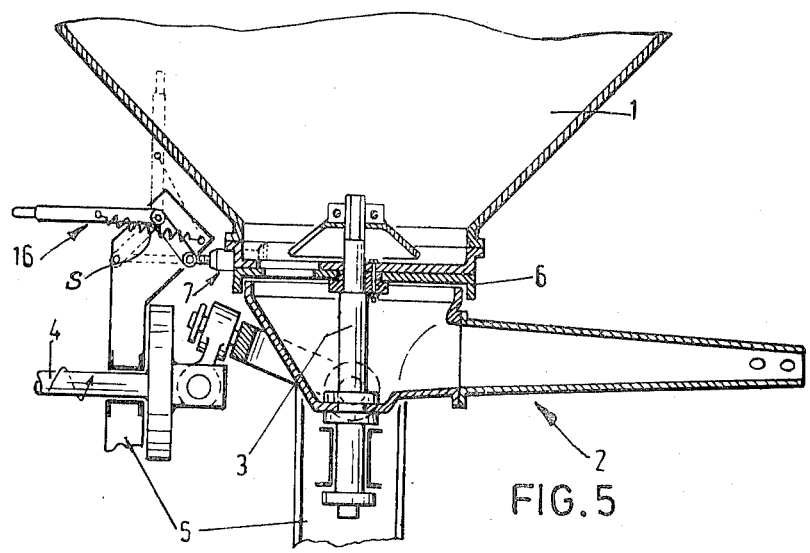
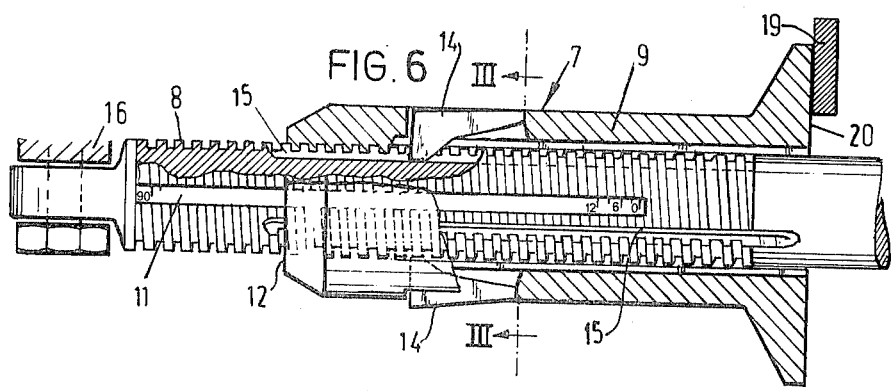
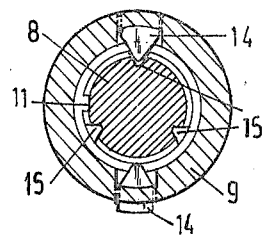
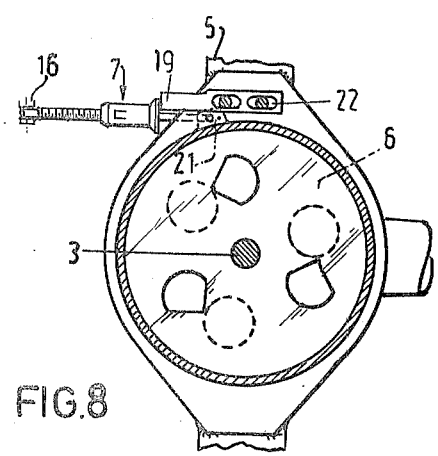

DEVICE COMPRISING AN ADJUSTABLE DOSING MEMBER FOR SPREADING DISTRIBUTABLE MATERIAL

The invention relates to a device for spreading distributable material, more particularly, fertilizer in granular or powdery form, said device comprising a hopper having at least one outlet port and a spreading member connected herewith and a dosing member to be adjusted for defining the passage of each outlet port, a control-mechanism moving the dosing member into a position in which the outlet port is closed or into the adjusted position.

In general it is desirable for the quantity of the material to be spread per unit of surface to be defined as accurately as possible, which requires a very accurate dosing and hence an accurate dosing and hence an accurate adjustment of the dosing member in said device.

For this purpose the invention provides a device in which the adjustment of the dosing member is performed by means of a screw means operative between the dosing member and the control-mechanism.

In a first preferred embodiment said screw means embodying the invention is formed by a screw spindle and a sleeve co-operating with the former. Either the screw spindle or the hollow screw may be operatively connected with the mechanism, the screw sleeve or the screw spindle respectively being then coupled with the dosing member.

In a second preferred embodiment of the screw means the screw spindle is directly coupled to the control mechanism and the dosing member, whilst the screw sleeve of the screw means adapted to move along the same and to be turned is caused to cooperate with a stop secured to the frame.

The stop secured to the frame defines either the completely closed position or zero position of the dosing disc or the fully open or maximum positon thereof. The place of the screw sleeve on the screw spindle defines the stroke of the screw spindle.

The stop on the frame is pereferably adjustable over a short distance in order to obtain accurately the correct zero position or the maximum position of the dosing member.

It is advantageous to provide the screw spindle and the screw sleeve with marks indicating the various positions of the dosing member. Further the screw means are adapted to be locked by grooves and co-operating tags in said various positions.

The invention will now be described more fully with reference to a drawing.

In the drawing

FIG. 1 shows a vertical sectional view of a device for spreading distributable material comprising one embodiment of a screw means in accordance with the invention, FIG. 2 is a longitudinal sectional view of the screw means shown in FIG. 1, FIGS. 3 and 4 are cross sectional views of the screw means of FIG. 2 taken on the lines III—III and IV—IV respectively.

FIG. 5 is a vertical sectional view of a device for spreading material, comprising a second embodiment of the screw means in accordance with the invention, FIG. 6 shows on an enlarged scale the screw means employed in the device shown in FIG. 1.

FIG. 7 is a cross sectional view taken on the line III—III in FIG. 2.

FIG. 8 is a plan view and partly an elevational sectional view of the dosing member with the associated screw means.

FIG. 1 shows a device for spreading material, comprising a hopper 1 having an outlet port in the bottom. A spreading member 2 joins said port and is formed by a conical, hollow body and a spreading pipe joined to the jacket thereof. The spreading member is caused to reciprocate about the shaft 3 by means of a transmission member driven by the driving shaft 4. The assembly is supported from a supporting frame 5, only two elements of which are illustrated. Between the bottom of the hopper 1 with the outlet port and the spreading member 2 a dosing member is arranged in the form of a disc 6 adapted to rotate about the vertical shaft 3. This disc 6 also has a passage so that, when the disc 6 is turned by means of a control-mechanism formed by a lever 16 arranged by way of a pivot on the frame 5 said passage will block the outlet port of the hopper 1 to a greater or lesser extent in accordance with the adjustment of the dosing member. The adjustment is performed by means of a screw means 7 arranged between the disc 6 and the lever 16.

The lever 16 has two end positions, in one of which the dosing member completely closes the outlet port, whereas in the outer the dosing member releases at least part of said outlet port. The spring-loaded pawl P is selectively received in one of the two notches 17 and 18 to define these end positions of the lever 16.

The adjustment of the dosing member 6 is performed by means of a screw means 7 arranged between the disc 6 and the frame 5.

Said screw means 7 is shown in detail in FIG. 2, 3 and 4.

The screw means shown in FIG. 2 comprises a screw spindle 8 and a screw sleeve 9 co-operating therewith. The screw spindle 8 is pivoted by one end to the lever 16 (see the left-hand side of FIG. 2). The screw sleeve 9 is coupled at its end remote from the screw spindle by a ball-and-socket joint with a rod 10, which passes to a point of the circumference of the disc 6 located beyond the plane of the drawing in FIG. 1 and which is pivotally coupled at said point.

It will be apparent that by turning the hollow screw 9 the distance between the pivot and the lever 16 and the ball-and-socket joint of the rod 10 can be increased or decreased so that in the other end position of the lever the disc can release a larger or smaller portion respectively of the outlet port.

In order to facilitate reading of the various positions of the disc 6 of the dosing member the screw spindle 8 is provided with marks on a flat, axial surface 11. The left-hand side 12 of the hollow screw 9 then serves as a pointer.

In order to indicate intermediate positions between the marks on the screw spindle the hollow screw 9 is provided with marks on an inclined surface 13 between the left-hand side 12 and the sheath of the screw (see also FIG. 3). The distribution on the surface 13 and the distance between the marks or the pitch of the screw spindle is such that one revolution of the hollow screw 9 covers the distance between two marks on the screw spindle 8.

In order to fix the hollow screw 9 in position relative to the screw spindle 8, the latter is provided at its end located in the hollow screw 9 with radially projecting tags 14 fitting in axial, longitudinal grooves 15 on the inner side of the hollow screw 9 (see also FIG. 4). The tags 14 have a resilience such that upon a turn of the hollow screw 9 the tag snaps inwardly via a ridge between two grooves 15 into the next groove.

As a matter of course, variations of the screw means in the first embodiment are possible. The hollow screw 9 may be imagined to be connected with the lever, whilst the screw spindle is integral with the rod 10.

FIG. 5 shows the second embodiment of the screw means. For a clear understanding all the corresponding parts of the spreading device and screw means are denoted with the same numerals. The working of the spreading device corresponds with that of the device in FIG. 1. The adjustment of the dosing member 6 by means of the pivoting of the lever 16 and the screw means 7 there in between will be described hereinafter.

The screw means 7 is shown in detail in FIGS. 6 and 7.

The screw means shown in FIG. 6 comprises a screw spindle 8 and a screw sleeve 9 co-operating therewith. The screw spindle 8 is pivoted by one end to the lever 16 (see the left-hand side in FIG. 6) and at the other end it is coupled with an ear 21 fastened to and projecting from the periphery of the disc 6 (see FIG. 8).

The screw sleeve 9 is freely movable along the spindle 8 by rotation and is provided at one end with a stop surface 20. This stop surface 20 is in co-operative relationship with a stop 19 on the frame 5 (see FIG. 8).

The position of the screw sleeve 9 with respect to the screw spindle 8 is indicated by the indicator surface 12 near the end of the screw sleeve 9 remote from the stop surface 20. This indicator surface 12 co-operates with an axial surface in the screw spindle 8, said surface 11 having a digital graduation.

In the sheath of the screw spindle 8 three axial longitudinal grooves 15 are provided at equal angualr intervals (see FIG. 7) for receiving the end of a resilient tag 14 held in the screw sleeve 9.

From FIG. 7 it will be apparent that three longitudinal grooves 15 and two diametrically opposite tags 17 are provided. In this way the screw sleeve 9 can be moved into six positions in each revolution, since each tag 17 snaps three times into a groove 15 over one revolution. In this embodiment the graduation on the screw spindle on the surface 11 is, therefore, such that in one revolution the graduation increments by 6 units. As a matter of course, other combinations are possible within the scope of the invention: there may be devised three tags and four grooves or alternatively two grooves and three tags.

The stop 19 on the frame 5 is preferably adjustable over a small distance, which is enabled in the embodiment shown in FIG. 8 by means of elongated slots 22 in the stop 19. By adjusting first the screw sleeve 9, for example, into the zero position and by turning the dosing disc 6 in this position, so that the openings in the bottom of the hopper 1 and in the disc 6 are just in contact with one another (see FIG. 7), the zero position can be simply adjusted by shifting the stop 19 so that it just touches the stop surface 20 of the screw sleeve 9. In this position the stop 19 is fixed, so that the zero position of the disc 6 is defined.

For a given dosing the screw sleeve 9 is adjusted into the position concerned, that is to say the surface 12 at the scale on the surface 11 so that, when the lever 16 is moved downwards out of the position indicated by broken lines (see FIG. 5) the screw spindle 8 can be displaced over a distance defined between the stop surface 20 and the stop 19 and the disc 6 can be turned. Thus the relatively co-operating ports in the bottom of the hopper 1 and the disc 6 will lie one above the other to a greater or lesser extent for defining the dosing opening. A spring S is connected between the lever 16 and the frame so that in either of the two positions of the lever, the spring is over center with respect to the pivot point of the lever.

As a matter of course, it is also possible to use a stop 19 for defining the maximum opening of the dosing disc 6. In this embodiment the screw sleeve 9 and the screw spindle 8 and the stop 19 on the side of the control-lever 16 are arranged symmetrically. Otherwise the adjustment and the control are the same.

What is claimed is:

1. In a spreading device including a frame, a hopper on said frame having at least one outlet port, an adjustable dosing member having at least one opening, said dosing member being movable between a fully closed position in which said opening does not overlap said outlet port and a dosing position in which said opening at least partially overlaps said outlet port, and a spreading member receiving material through said opening when said dosing member is in a dosing position;

control means connected between said frame and said dosing member for adjusting the overlap between said opening of the dosing member and said outlet port when said dosing member is in a dosing position, said control means including a hand-operated member movable to one of two positions corresponding respectively to said fully closed and dosing positions of said dosing member and means for positively holding said hand-operated member in that one of its two positions to which it is moved, a threaded spindle with cooperating sleeve threaded thereon connecting said hand-operated member to said dosing member to determine the amount of overlap between said opening and said outlet port when said hand-operated member is moved to that position corresponding to said dosing position of the dosing member, and indicating means formed between said spindle and sleeve for indicating said amount of overlap.

2. In a spreading device as defined in claim 1 including means resiliently engaged between said spindle and said sleeve for positively holding an adjusted position between said spindle and said sleeve.

3. In a spreading device as defined in claim 1 wherein said spindle and said sleeve form an adjustable length link between said hand-operated member and said dosing member.

4. In a spreading device as defined in claim 1 wherein said spindle connects said hand-operated member to said dosing member, and including a stop fixed to said frame, said sleeve being adjustable along the length of said spindle to cooperate with said stop and define said dosing position of the dosing member.

5. In a spreading device as defined in claim 4 wherein said stop is adjustably fixed to said frame.

6. In a spreading device as defined in claim 2 wherein the means last mentioned comprises a pawl carried by one of the two elements constituted by said spindle and said sleeve and a plurality of grooves in the other element.

7. In a spreading device as defined in claim 6 wherein said grooves are evenly spaced circumferentially around said other element.

8. In a spreading device as defined in claim 7 wherein a plurality of pawls is provided, one less than the number of grooves.

9. In a spreading device as defined in claim 2 wherein said hand-operated member is a lever pivoted to said frame and wherein said means for positively holding said hand-operated member comprises a locking pawl engaged with same frame.

10. In a spreading device as defined in claim 2 wherein said hand-operated member is a lever pivoted to said frame and wherein said means for positively holding said hand-operated member comprises a spring fixed to said lever and to said frame so as to be in over center condition with respect to the pivot between said lever and frame in each of said two positions of the lever.

* * * * *